UNITED STATES PATENT OFFICE.

ROBERTO FULLONI, OF ROME, ITALY.

PIGMENT WITH BASIS OF CALCIUM CYANAMID AND PROCESS OF MAKING SAME.

957,153.  Specification of Letters Patent.  Patented May 3, 1910.

No Drawing.  Application filed March 14, 1910.  Serial No. 549,342.

*To all whom it may concern:*

Be it known that I, ROBERTO FULLONI, a subject of the King of Italy, and residing at 66 Via Due Macelli, Rome, Italy, have invented certain new and useful Improvements in Pigments with Basis of Calcium Cyanamid and Process for Making Same, of which the following is a specification.

The present invention relates to the use of calcium cyanamid or other cyanamid salts as basic material in the production of pigments. It is based on the discovery that a solution of a salt of a heavy metal acting on calcium cyanamid or other cyanamid salts will produce durable and insoluble substances which—abstracted from the color—can be advantageously substituted for the minium and other mineral substances used in preparing paints and coatings for covering iron and other metals, wood etc.

Experiments which have been carried on for more than a year have shown that the new pigments are distinguished by the following qualities: inalterability; resistance to acids and acid emanations; resistance to heat and low temperatures; resistance to water, even if containing saline solutions; adhesion and solidity; covering capacity superior to that of lead preparations. The density of these pigments, (for instance of those whose base is formed by raw calcium cyanamid and sulfate of copper or sulfate of zinc) stands to that of the minium in the proportion of 1 to 4. Their covering capacity (taking as example the pigment whose base is formed of raw calcium cyanamid and sulfate of copper in the form of paint already mixed and ground with boiled oil etc. ready for the brush, stands to that of the minium in the proportion of 2 to 1.

It is only to give an idea of the principle upon which the process of fabrication is based that the following practical example is given, and it is in no way intended to limit the applications or systems of application of the process itself, either with regard to the choice of the cyanamid and metallic salts used and their proportions, or with regard to the modes of fabrication, the duration of the operations or the temperature under which they have to be carried out etc., steps in the process being susceptible to variations according to whether one or another cyanamid salt, or one or another metallic salt—or several salts together.

In a metallic receiver, preferably of copper (vessels of earthenware or other similar substance can also be used) about 350 parts (by weight) of sulfate of copper are dissolved in about 750 parts of water and then 1000 parts of raw calcium cyanamid are poured into this solution. The mass is then stirred rapidly and continuously for about two hours and maintained during the operation at a temperature of from 50 to 60° C. The mass is then poured into another similar receiver (provided with cover) where it is left to rest for about 24 hours. After having subjected the product to a rough grinding and having spread it out in layers of three to five centimeters thick on glass or similar plates, it is placed to dry in a room in which the temperature is maintained at from 35 to 40° C. As soon as the product is completely dry it has only to be subjected to a careful grinding in order to bring it into that state of impalpability which is required from every pigment for its quicker and more perfect combination with oils etc.

What I claim and desire to secure by Letters-Patent is:

1. A basic material for paints consisting of a salt of cyanamid in combination with a metallic salt.

2. In a paint, the combination of a vehicle and a salt of cyanamid.

3. In a paint, the combination of a vehicle, a salt of cyanamid and a metallic salt.

4. In a paint, the combination of a vehicle, calcium cyanamid and a metallic salt.

5. In a paint, the combination of a vehicle, calcium cyanamid and a sulfate of a metal.

6. The process of preparing a basic ingredient for paints which includes treating a salt of cyanamid with a solution of a metallic salt.

7. The process of preparing a basic ingredient for paints consisting in forming a solution of a metallic salt and combining therewith a salt of a cyanamid.

8. The process of preparing a basic ingredient for paints consisting in forming a solution of a metallic salt and combining therewith a salt of a cyanamid under the action of heat.

9. The process of preparing a basic ingredient for paints, consisting in dissolving 350 parts by weight, of sulfate of copper, in 750 parts by weight, of water, adding thereto 1000 parts by weight, of calcium cyanamid, stirring the mixture while maintaining it at a temperature approximating 60 degrees C., and drying and grinding the product so formed.

10. The process of preparing a basic ingredient for paints, consisting in dissolving 850 parts by weight, of sulfate of copper, in 750 parts by weight, of water, and adding thereto 1000 parts by weight, of calcium cyanamid, stirring the mixture while maintaining it at a temperature approximating 60 degrees C., allowing the resultant mass to rest for a period of time, subjecting it to a coarse grinding, drying it, and subjecting it to a final grinding.

In witness whereof, said ROBERTO FULLONI has signed this specification at Rome in the Kingdom of Italy this 25th day of February 1910.

ROBERTO FULLONI.

In the presence of two witnesses:
W. W. VENEDETTI,
CONSTANTINO FRANCENY.